Patented Sept. 21, 1943

2,329,934

UNITED STATES PATENT OFFICE 2,329,934

CATALYTIC PROCESS

Friedrich Franz Nord, Bronx, N. Y., assignor to Baker & Company, Inc., Newark, N. J., a corporation of New Jersey No Drawing. Application February 15, 1943, Serial No. 475,972

5 Claims. (Cl. 260—690)

This invention relates to catalysts and catalytic processes and is concerned in particular with catalytic processes involving the utilization of colloidal platinum metal catalysts.

This application is a continuation in part of my application Serial No. 376,331, filed January 28, 1941.

It is one object of this invention to provide a catalyst of a metal of the platinum group which shall be more efficient than other such catalysts as heretofore known. It is another object of this invention to provide a catalyst of colloidal platinum metal which shall have great stability and high catalytic activity and performance. It is a further object of this invention to provide such improved catalysts for catalytic processes such as oxidation, polymerization, synthesis, hydration and dehydration, hydrogenation and dehydrogenation, and the like processes. The prime object of this invention is, therefore, the reaction of substances in the presence of a colloidal platinum metal catalyst in such manner that the efficiency of such catalytic reaction is enhanced.

Hydrogenation processes for instance involve the reaction of organic compounds, for instance fats, oils, nitro-compounds, etc., with hydrogen, for the purpose of adding hydrogen to the organic compound, or for the purpose of reducing the organic compound with or without the simultaneous addition of hydrogen thereto. Such processes may, therefore, involve, for instance, the hydrogenation of compounds having a carbon-carbon or carbon-nitrogen double bond or the reduction of keto or aldehyde groups, processes which are of particular importance in the hydrogenation of fats and oils in the manufacture of terpenes, alkaloids, therapeutics and vitamins, as well as in the hydrogenation of unsaturated hydrocarbon compounds in the petroleum industry.

It is, of course, known to carry out catalytic reactions in the presence of platinum metal catalysts. In such case the sols of the catalyst metal are used in dispersion in various suitable solvents and are accompanied in such solvent by a so-called protective colloid which serves to stabilize the sol of the metallic platinum metal catalyst. The substance to be catalyzed is, likewise, introduced into such solvent containing the colloidal platinum metal catalyst, or the solvent containing the colloidal platinum metal catalyst is mixed with the substance to be catalyzed, and the reaction takes place under the influence of and in the presence of the catalyst.

Protective colloids as heretofore used in connection with colloidal platinum metal catalysts comprise such substances as gum arabic, gelatin, lysalbinic or protalbinic salts, cholesterole or isocholesterole or the like. The presence of such protective colloids affects, however, the catalytic activity of the colloidal catalysts in such manner that the stability produced is accompanied by a corresponding weakening of the catalytic activity, whereby the catalytic activity is affected in ratio to the stability produced by the protective colloid. In general the gold number (Zsigmondy) is taken as a rough indication of the protective action of a protective colloid, so that the lower the gold number the better the protective effect but the more the catalytic activity is deleteriously affected.

I have found that the efficiency of the catalytic reaction can be increased by carrying out the reaction in the presence of a colloidal platinum metal catalyst accompanied in its solvent by a synthetic organic polymer acting as a protective colloid, instead of by a natural protective colloid as heretofore employed, in that solutions of colloidal platinum metal and synthetic organic polymers combine high stability with high catalytic activity. The degree of polymerization of such synthetic organic polymers does not appear to be critical although as a general rule I found that a higher degree of polymerization expressed itself in higher catalytic activity.

The synthetic organic polymer acting as protective colloid for the colloidal platinum metal catalyst must be homogeneous and non-resinous and must be soluble in the particular catalyst solvent employed. Resins, plastics and the like non-homogeneous combinations are not suitable for use as protective colloids.

I have found particularly suitable for use as protective colloids for colloidal platinum metal catalysts such synthetic organic polymers as for instance vinyl and acrylic polymers and among them, for instance monomere compounds such as acrylic acid and polymerized compounds such as polyvinyl alcohol, polyacrylic acid and esters, such as methyl, butyl or propyl esters, of polyacrylic acid. Other polymerized synthetic organic compounds, such as methylmethacrylate, polyvinyl acetate, polyvinyl acetals, have also been found to be highly useful. While I prefer to employ synthetic organic compounds belonging to the group consisting of vinyl and acrylic polymers, my invention is not limited to members of such restricted group, as I may employ with favorable results any other homogeneous non-resinous synthetic organic polymer soluble in the solvent of the colloidal platinum metal catalyst. In this connection I may mention, for instance, dipentene or inactive limonene.

The catalyst employed in accordance with the invention comprises, therefore, a colloidal solution of platinum metal and a synthetic organic polymer, wherein the synthetic organic polymer acts as a protective colloid for the colloidal platinum metal. The solvent for the colloidal platinum metal and the synthetic organic polymer comprises any suitable liquid medium such as water, alcohol, acetic acid, hydrocarbons, etc. The catalytic platinum metal may be platinum or palladium or any other suitable member of the platinum group and the catalyst solution may contain one or more metals of the platinum group in colloidal form either alone or together with other catalytic or non-catalytic substances which may, for instance, increase, promote or otherwise be beneficial to the catalytic process. Thus I have found, for instance, that the catalyst solution may further contain vanadium in a state of lower valency, whereby less colloidal platinum metal is necessary to produce the same result produced by larger quantities of colloidal platinum metal without the presence of such lower valent vanadium, such catalyst being more particularly described in my co-pending application, Serial No. 376,332, filed January 28, 1941.

In order to illustrate the high efficiency of catalytic reactions in the presence of catalysts of colloidal platinum metal and synthetic organic polymers, reference is made to the following experiments with a shaker having a speed of about 250 oscillations per minute with an eccentricity of 1.75" or a total stroke of 3.5".

I found for instance, with a solution of 1 cc. nitrobenzene, 50 cc. 50% alcohol and 1 gr. sodium hydroxide, that such solution in 5 min. absorbs 135 cc. hydrogen, with a catalyst of 20 mg. colloidal palladium and 100 mg. tragacanth, 137 cc. hydrogen with a catalyst of 20 mg. colloidal palladium and 100 mg. gum arabic, and 370 cc. hydrogen with a catalyst according to my invention of 20 mg. colloidal palladium and 100 mg. polyvinyl alcohol. This experiment shows that with a given quantity of colloidal catalyst and with a given quantity of protective colloid the catalyst according to my invention develops greater catalytic activity than colloidal catalysts heretofore known. In a similar experiment the solution in 5 min. absorbed 290 cc. hydrogen with a catalyst of 10 mg. colloidal palladium and 100 mg. polyvinyl alcohol as protective colloid as compared with an absorption of only 65 cc. hydrogen with a catalyst of 10 mg. colloidal palladium and 100 mg. gum arabic, so that even smaller quantities of the catalyst according to my invention exhibit an activity considerably higher than like quantities of catalyst as heretofore known.

In general, with colloidal catalysts as heretofore known, the catalytic activity increases with increasing dilution of the protective colloid. I have found, however, that in the catalyst according to my invention the catalytic activity tends to increase with increasing amounts of protective colloid. Thus I found, for instance, with a nitrobenzene solution as previously described and a catalyst of 10 mg. colloidal palladium, that the solution in 5 min. absorbs 155 cc. hydrogen in the case of 5 mg. polyvinyl alcohol, 230 cc. hydrogen in the case of 25 mg. polyvinyl alcohol, 290 cc. hydrogen in the case of 100 mg. polyvinyl alcohol, and 380 cc. hydrogen in the case of 250 mg. polyvinyl alcohol. There is a maximum catalytic effect at a more or less definite maximum concentration of synthetic protective colloid, which, however, may differ with different protective colloids and the manufacture thereof.

Similar high activity, combined with great stability, was observed in other hydrogenation processes. A catalyst of 10 mg. colloidal palladium with 250 mg. polyvinyl alcohol caused for instance the absorption of 170 cc. hydrogen in 15 min. and 260 cc. hydrogen in 35 min. in a solution of 10 gr. castor oil (iodine #84) in a neutral medium, and of 190 cc. hydrogen in 15 min. and 355 cc. hydrogen in 35 min. in a solution of 10 gr. fish oil (iodine #129.5) in a neutral medium.

The colloidal catalyst may be prepared in any suitable manner. I may, for instance, dissolve a platinum metal compound in a solution of the synthetic polymer and then convert the platinum metal compound into colloidal platinum metal. In one specific example of one method of preparing such catalysts I may take for instance 12.5 cc. of a 2% aqueous solution of polyvinyl alcohol, add 11 cc. water, and dissolve therein 1 cc. of a 1% platinum chloride solution; I may then add 0.5 cc. of a 4% sodium carbonate solution to convert the palladium to the hydroxide, adding a desired solvent, such as water or alcohol, and subsequently reducing the palladium hydroxide to colloidal palladium by the introduction of hydrogen, although the polyvinyl alcohol itself is capable of reducing the solution of palladium chloride to colloidal palladium even in the absence of hydrogen. A palladium methacrylate catalyst may be prepared, for instance, by providing 20 cc. of a 2% glacial acetic acid solution of methylmethacrylate, adding 29 cc. of glacial acetic acid, and then adding 1 cc. of a 1% palladium chloride solution, and subsequently reducing the palladium compound to colloidal palladium. It will be understood, however, that the colloidal solution of platinum metal and synthetic organic polymer may be produced by other suitable methods.

Natural protective colloids, as heretofore used, comprise an aggregation of different related chemical compounds of similar nature. Their properties are not easily and not always reproducible in a uniform manner and they affect detrimentally the catalytic activity of the colloidal metal which they accompany.

The protective colloids accompanying the colloidal metal of the platinum group to form the catalysts according to this invention are synthetic and, preferably, highly polymerized compounds, and constitute single chemical entities. Their properties are easily and uniformly reproducible and increase rather than decrease the catalytic activity of the colloidal metal of the platinum group which they accompany, while yet conveying great stability to the colloidal metal, thereby resulting in a catalyst of greater stability and higher catalytic activity than in the case of catalysts heretofore known. The nature of my catalyst accompanied by the protective colloids of the type described is such that not only pure hydrogen may be used in hydrogenation processes, but also mixtures of hydrogen with carbon monoxide, as in the well known water gas, or even carbon monoxide alone, a property not previously associated with colloidal platinum metal catalysts. A further advantage of my catalysts, as distinguished from colloidal catalysts heretofore known, is that they can be used in acid, neutral as well as alkaline media. Compounds such as acrylic acid are suitable in particular for use in organic media, whereas compounds such as polyvinyl alcohol are particularly useful in solutions which are at least in part aqueous.

The synthetic and, preferably, highly polymerized organic compound colloids forming part of the catalyst according to this invention may be used in various concentrations. I believe that one reason for the beneficial characteristics of my novel catalyst is the great dispersion of the protective colloid and therewith of the catalyst metal, a dispersion far greater than that of the natural colloids heretofore used. The particle size of the protective colloid accompanying my catalyst can be changed by freezing without alteration of the structure thereof. However, freezing may result in aggregation of particles as well as in disaggregation, and therewith greater dispersion, depending on the concentration of the solution. By freezing for instance a 2% solution of polyvinyl alcohol and the like I obtain an aggregation, whereas by freezing for instance a 0.1% solution of the same protective colloid I obtain a disaggregation. While I have not determined the exact dividing line in the concentration of solutions below which freezing causes disaggregation and above which freezing causes aggregation, I believe, on the basis of experiments, that the dividing zone is at a concentration of between 0.5% and 1%. The freezing itself may be carried out at any suitable temperature for the desired length of time. I have carried out such freezings for from 5 minutes to 3 hours at temperatures such as $-5°$ C., $-17°$ C., $-18°$ C., and $-78°$ C., and have found all such temperatures satisfactory to produce substantially the same results. I may freeze a solution containing only the protective colloid, or I may freeze a solution containing both the protective colloid and the colloidal platinum metal. The aggregation or disaggregation of the colloidal particles does not influence the degree of polymerization of the protective colloid.

By thus freezing the protective colloid, with or without simultaneous dispersion of the colloidal platinum metal, I may thus further increase the catalytic activity of such catalysts in concentrations of not more than about 0.5% or about 1%. In hydrogenating for instance a nitrobenzene solution as previously stated a catalyst of 10 mg. colloidal palladium, 20 mg. polyvinyl alcohol (Du Pont 488) in a 0.1% solution absorbed in 8 min. 330 cc. hydrogen without freezing and 397 cc. hydrogen after having been frozen and then thawed. It will be understood that I recommend freezing only for low concentrations, as I have found that freezing of high concentrations and resultant aggregation of colloidal particles tends to produce a decrease in catalytic activity; thus in hydrogenating for instance a nitrobenzene solution as previously stated a catalyst of 10 mg. colloidal palladium with 150 mg. polyvinyl alcohol (Du Pont 488) in a 2% solution absorbed in 8 min. 440 cc. hydrogen without freezing and 415 cc. hydrogen after having been frozen and then thawed. It will be apparent, therefore, that high concentrations of the synthetic colloids forming part of my novel catalyst are always preferable to low concentrations and that where low concentrations have to be used for some reason the catalytic activity can be increased by freezing.

The expression "catalyzing chemical compounds in the liquid phase," as hereinafter used, refers to the reacting of chemical compounds by contacting such compounds with the platinum metal catalyst herein described dissolved in a liquid medium, as by introducing the chemical compound or compounds into the solvent containing the catalyst, or by introducing the solvent containing the catalyst into the substance to be catalyzed or a solution containing such substance.

What I claim is:

1. The method of catalytically hydrogenating chemical compounds in the liquid phase comprising reacting the chemical compound with hydrogen in the presence of a catalyst comprising a colloidal solution of a metal of the platinum group and a homogeneous non-resinous synthetic organic polymer, said organic polymer acting as a protective colloid for said colloidal metal of the platinum group.

2. The method of catalytically hydrogenating a chemical compound in the liquid phase comprising reacting the chemical compound with hydrogen in the presence of a catalyst comprising a colloidal solution of a metal of the platinum group and a synthetic organic polymer of the group consisting of vinyl and acrylic polymers, said organic polymer acting as a protective colloid for said colloidal metal of the platinum group.

3. The method of catalytically hydrogenating chemical compounds in the liquid phase comprising reacting the chemical compound with hydrogen in the presence of a catalyst comprising a colloidal solution of a metal of the platinum group and polyvinyl alcohol, said polyvinyl alcohol acting as a protective colloid for said colloidal metal of the platinum group.

4. The method of catalytically hydrogenating chemical compounds in the liquid phase comprising reacting the chemical compound with hydrogen in the presence of a catalyst comprising a colloidal solution of palladium and a homogeneous non-resinous synthetic organic polymer, said organic polymer acting as a protective colloid for said colloidal palladium.

5. The method of catalytically hydrogenating a chemical compound in the liquid phase comprising reacting the chemical compound with hydrogen in the presence of a catalyst comprising a colloidal solution of palladium and a synthetic organic polymer of the group consisting of vinyl and acrylic polymers, said organic polymer acting as a protective colloid for said colloidal palladium.

FRIEDRICH FRANZ NORD.